United States Patent [19]

Kuzub

[11] Patent Number: 5,099,984
[45] Date of Patent: Mar. 31, 1992

[54] TELESCOPIC AUGER

[76] Inventor: Danny S. Kuzub, Box 878, Whitewood, Saskatchewan, Canada, S0G 5C0

[21] Appl. No.: 543,866

[22] Filed: Jun. 20, 1990

[51] Int. Cl.$^5$ ............................................. B65G 65/16
[52] U.S. Cl. ..................... 198/518; 414/319; 198/588; 198/668; 198/660; 198/659
[58] Field of Search ............... 198/659, 660, 657, 666, 198/668, 587, 588, 518, 317, 535, 536; 414/319, 320, 321

[56] References Cited

U.S. PATENT DOCUMENTS

| | | | |
|---|---|---|---|
| 2,045,757 | 6/1936 | Constantin | 198/659 |
| 2,393,572 | 1/1946 | Soma | 198/668 |
| 2,640,577 | 6/1953 | Roscoe et al. | 198/518 |
| 2,763,362 | 9/1956 | Greaves | 198/668 X |
| 2,845,167 | 7/1958 | Heiken | 198/660 |
| 3,064,830 | 11/1962 | Reed . | |
| 3,092,241 | 6/1963 | Dubie | 198/659 |
| 3,381,802 | 5/1968 | Levadney et al. | 198/668 |
| 3,560,133 | 2/1971 | Ryczek . | |
| 3,605,995 | 9/1971 | Maack | 198/660 |
| 3,709,357 | 1/1973 | Brown | 198/659 |
| 3,727,746 | 4/1973 | Slusher | 198/659 |
| 4,356,910 | 11/1982 | Togstad | 198/660 |
| 4,443,149 | 4/1984 | Isaacson . | |
| 4,621,968 | 11/1986 | Hutchison . | |
| 4,669,941 | 6/1987 | West et al. | 198/518 X |
| 4,824,312 | 4/1989 | Schiltz | 198/668 X |

OTHER PUBLICATIONS

Brochure from "Iowa Farmers Hot Line", dated Oct. 1990, showing Schiltz Manufacturing Inc. advertising.

Primary Examiner—D. Glenn Dayoan
Attorney, Agent, or Firm—Adrian D. Battison; Stanley G. Ade; Murray E. Thrift

[57] ABSTRACT

A clean-out auger for a grain bin has a main auger, a telescoping sweep and a rotary joint connecting the two. The sweep may be adjusted in length to accomodate bins of different sizes. The use of a flexible screw section through the rotary joint allows the sweep to rotate through 360° during operation. A sweep transporting mechanism is fixed to the outer end of the sweep for producing the rotation about the rotary joint.

21 Claims, 4 Drawing Sheets

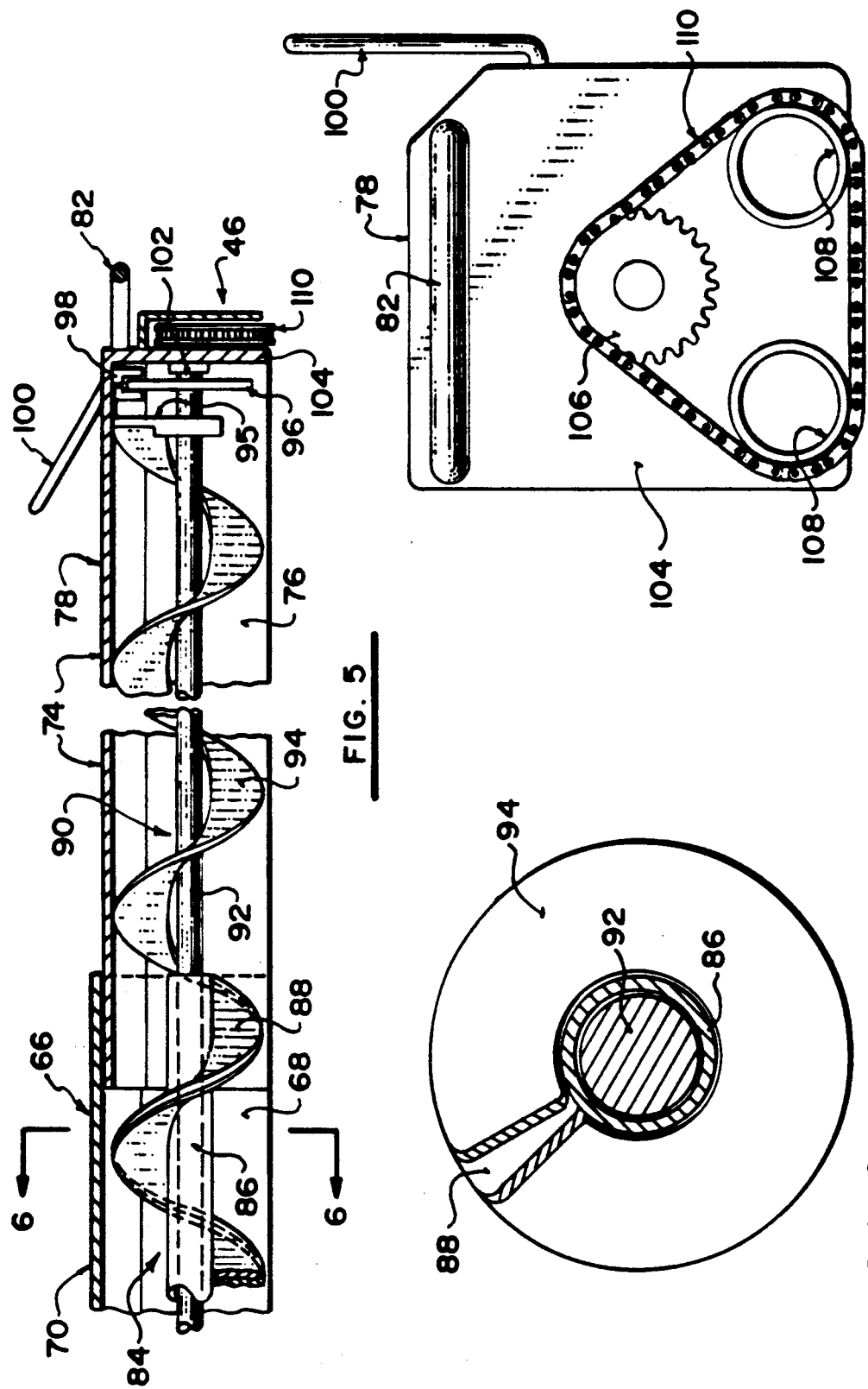

TELESCOPIC AUGER

FIELD OF THE INVENTION

The present invention relates to unloading augers for grain bins and to sweeps therefor.

BACKGROUND

Various proposals have been made for apparatus for use in unloading grain from a grain bin. These include various bin sweeps, which are devices for drawing grain across the bin floor to the inlet of a main unloading auger. Problems with the known devices include the length of the sweep, which must be short enough to fit into any bin to be swept but long enough to provide an efficient sweeping of all parts of the largest bin to be unloaded and manipulation of the sweep to cover the entire bin floor.

Bin sweeps which are attached at the lower end which is the feed end of a main auger are well known and arranged to be coupled to the lower end of the main auger to be driven by that lower end and include a helical flight to sweep the material from the bin toward the lower end for transportation along the main auger. An example of this device is shown in U.S. Pat. No. 2,640,577 (Roscoe). These devices have many disadvantages in that they do not fully sweep the floor area of the bin leaving the user to carry out much shoveling. In particular the sweep cannot rotate fully around the lower end of the auger and is limited to a certain arc within the bin. In addition the sweep is of a fixed length so that it cannot accomodate different sizes of bins.

Another example of a device of this type is shown in U.S. Pat. No. 2,763,362 (Greaves) which shows a sweep of this general type which is coupled together in three lengths to attempt to increase the amount of area which can be swept but again there are many problems. A further older device is shown in U.S. Pat. No. 2,393,572 (Soma) which provides again a sweep of limited action but in this case the material is discharged through an air duct out of the bin. The sweep itself however retains the difficulty of covering the full area of the bin.

A more recent device is shown in U.S. Pat. No. 4,669,941 (West) which shows a device which can pivot around a fixed point within a bin but again the sweeping arc of the device is limited and the device is necessarily fixed within a particular bin and cannot be used with more than one bin.

A yet further device is shown in the more recent U.S. Pat. No. 4,824,312 (Schiltz) which discloses a fixed duct mounted within the bin which extends from one wall to a central position at which there is a vertical auger section. At the bottom end of the vertical auger section is coupled a sweep auger which can rotate 360° around the bin floor. The sweep auger can be decoupled and removed but the remainder of the equipment remains coupled within the bin.

This device therefore has a number of disadvantages. Firstly the main part of the device remains fixed within a bin and therefore each bin requires a separate piece of equipment at accumulatively high cost. Secondly the device is associated with a particular diameter of bin and cannot be used with other types of bins. Thirdly the coupling between the auger section which extends outwardly of the wall of the bin, the vertical section and the sweep section is obtained by gear boxes located inside the auger tubes which thus seriously restrict the amount of flow which is obtained and thus significantly increases the amount of time necessary for cleanout of the bin. Furthermore the sweep auger section has a shroud around a rear part of the auger section to assist in transportation of the material but otherwise is uncovered and is driven by a large wheel at the outside end. This drive system will cause the auger once freed from the material to move rapidly around the floor of the bin which can be very dangerous to any user within the bin. Furthermore the exposure of the flight is again very dangerous in that the rapidly moving sweep can seriously damage the legs of the user if caught unawares within the bin.

Flexible couplings provided in an auger system are known for example in U.S. Pat. No. 3,092,241 (Dubie), 3,709,357 (Brown) and 3,727,746 (Slusher). The first of these patents provides a flexible sleeve formed in a plurality of movable sections together with a flexible core within the sleeve which carries a plurality of separate collars. However this provides a construction which has a very gradual radius of curvature so that the material must be lifted to a relatively high level by the inefficient auger system at the curved section thus significantly reducing the speed of transport of the material. In addition the design shown is totally unsuitable for use as a device for removing material from a bin. The further two patents of Brown and Slusher simply disclose flexible auger flights which curve around a required corner but which are unsuitable for use with particular material.

Auger systems which can be expanded or contracted in length are also known from U.S. Pat. Nos. 4,356,910 (Togstad), 2,845,167 (Hieken), and 3,605,995 (Maack). In each of these cases an auger system includes a telescopic sleeve and an auger flight formed from two portions one of which can be screwed relative to the other to increase and decrease the amount of overlap between the two flight sections. In Heiken the movement is obtained by rotating an inner drive element carrying one flight portion relative to an outer drive element to thus provide the screw action following which the inner and outer drive elements are coupled by a transverse pin holding the auger at the required length. In Maack, the length of the device is controlled by fixing the length of the outer sleeves. In Toggstad the total length of the auger is controlled by either a cylinder system which moves the telescopic tube in and out or as shown in the drawings by a threaded rod which locks the outer end of the sleeve relative to the outer end of the first flight section. These devices are therefore difficult to adjust and accordingly are unsuitable for use where rapid adjustment is required for example in a bin sweep.

The present invention addresses these and other problems with known bin sweeps and sweep auger combinations.

SUMMARY

According to one aspect of the present invention there is provided a bin sweep including
- a first sweep section having a screw conveyor with a core tube and a first helical flight secured therealong;
- a second sweep section having a second screw conveyor with a second core slideable in the core tube of the first sweep section, with an outer end of the second core projecting from the core tube, a second helical flight extending along the second core and having substantially the same pitch as the first helical flight, the second flight being secured to the second core at the outer end of the second core, and being otherwise unconnected to the second core, the second flight being in threaded engagement with the first flight whereby relative rotation of the two screw conveyors causes telescoping of the sweep to change the combined length of the screw conveyors.

The telescopic bin sweep offers a wide range of bin sizes, for example, from 14' to 28' diameter.

The second auger section is preferably equipped with a brake that may be used to stop rotation of the second section, while the first section continues to be driven. This action may be used for a power extension or retraction of the sweep, depending on the direction of rotation of the screw.

It is also desirable to provide a transporting mechanism at the outer end of the second section, driven by the second core. This is used to swing the sweep through an arc while grain is drawn by the sweep into the main auger.

Another preferred characteristic of the invention is the coupling of the sweep to a main auger tube through the use of a rotary union including a flexible screw section. This includes a flexible shaft and double flighted screw segments spaced along the flexible shaft. The flexible shaft is connected at its opposite ends to the sweep screw and the screw of the main auger so that a single hydraulic motor can drive the complete system. There is no discontinuity in the feed from the sweep through to the main auger outlet. This also allows the sweep to swing through 360° about the end of the main auger.

BRIEF DESCRIPTION OF THE DRAWINGS

In the accompanying drawings, which illustrate an exemplary embodiment of the present invention:

FIG. 5 is a section of a bin sweep showing details of a sweep transport;

FIG. 6 is section along line 6—6 of FIG. 5; and

FIG. 7 is an end view of the sweep transporting mechanism.

DETAILED DESCRIPTION

Figure 1:
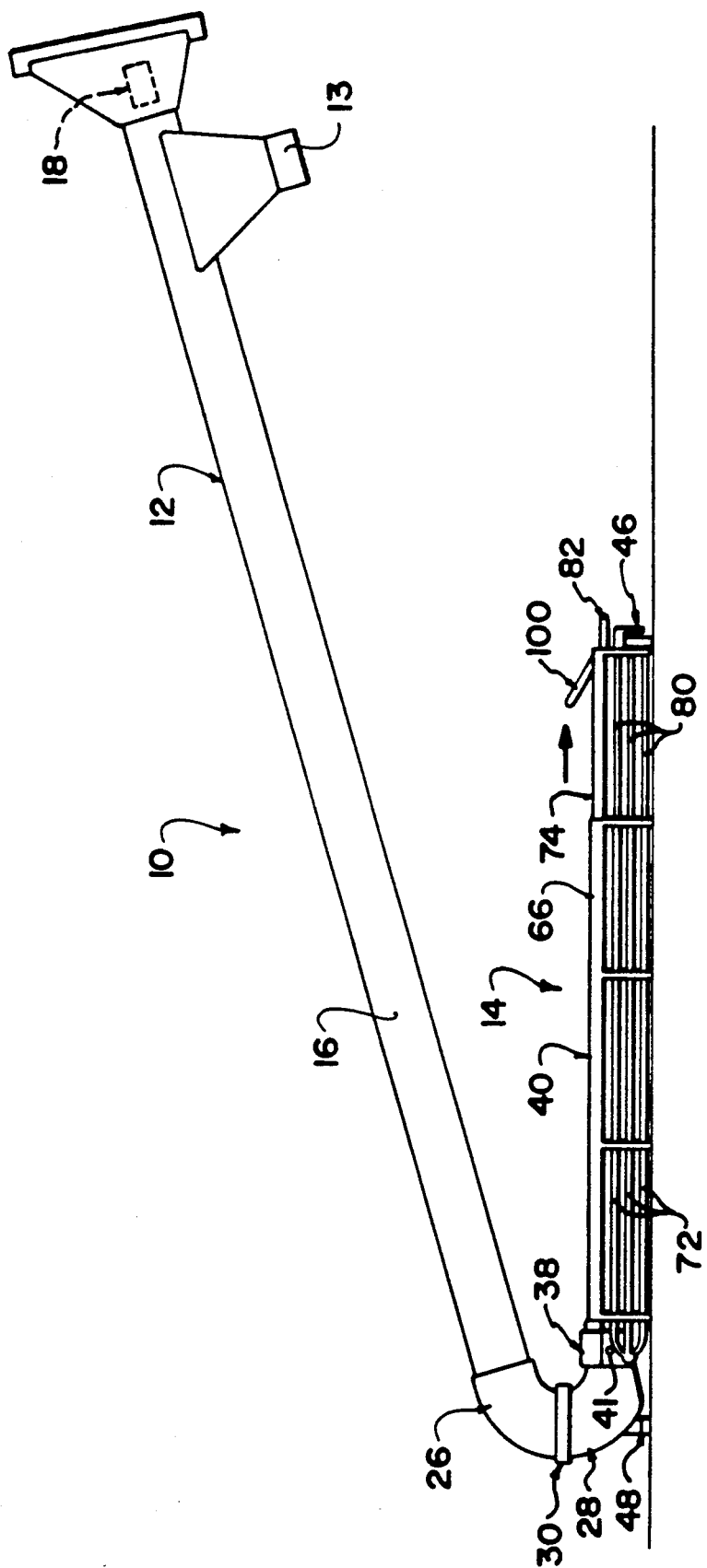
FIG. 1 is a side elevation of an unloading auger according to the present invention.
Figure 2:
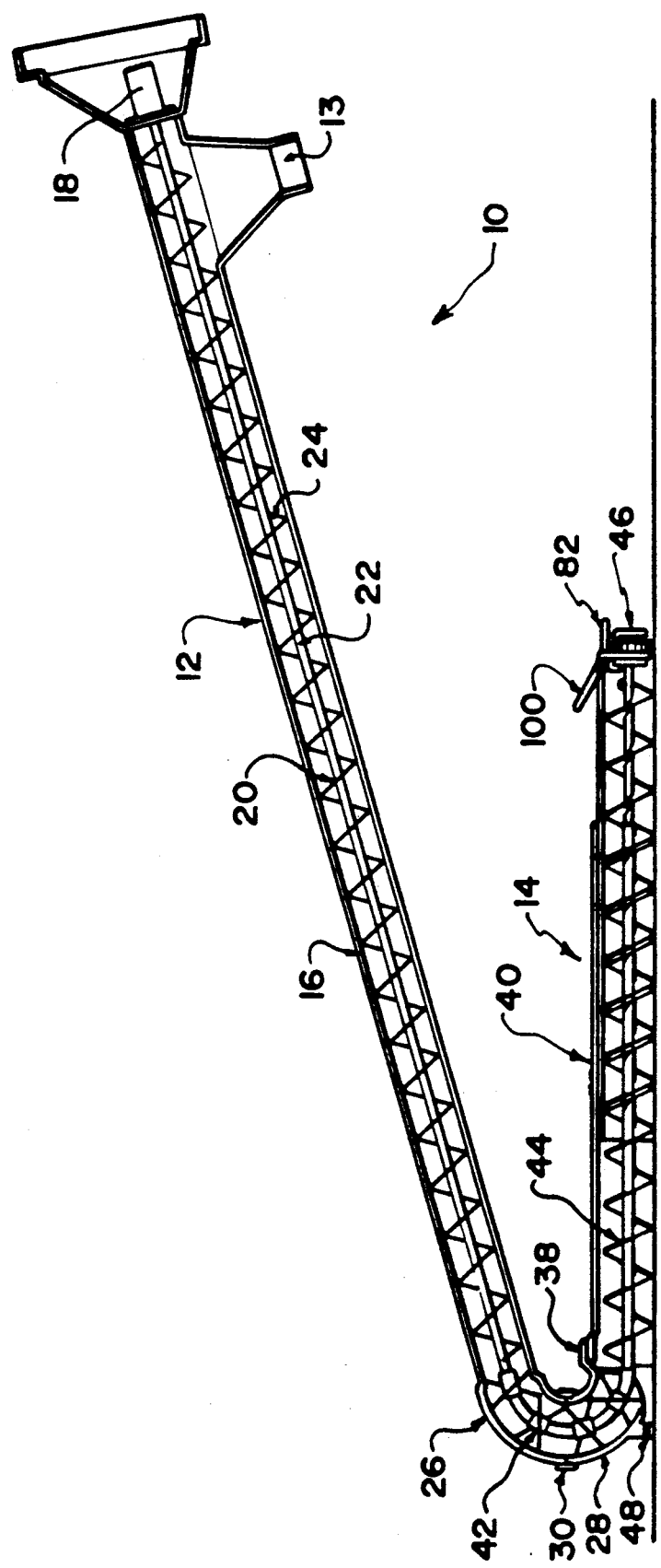
FIG. 2 is a side elevation like FIG. 1 in cross section.

Referring to the accompanying drawings, there is illustrated a grain unloading auger 10 with a main auger section 12 for delivering the grain through an outlet 13. The auger also includes a sweep 14 for gathering grain from the floor of a bin and feeding it to the main auger 12.

The main auger includes an auger tube 16 carrying on its outer end an hydraulic motor 18. The motor 18 drives an auger screw 20 extending along the tube 16. Screw 20 includes a shaft 22 and helical flighting 24.

At the end of the main auger, opposite the hydraulic motor, the tube 16 is connected to a rigid tubular elbow 26. The elbow 26 is in turn connected to a second elbow 28 through a rotary joint 30. Both elbows extend as shown through approximately 90° making a total of the order of 180°. The joint includes an annular ring 32 fixed to the elbow 26 and overlapping the confronting end of the elbow 28 and a radial flange 34 extending from the end of the ring 32 into an annular slot 36 in the elbow 28.

At the end of the elbow 28 opposite the rotary joint 30 is a shroud 38 that is connected to a sweep housing 40 through the use of two diametrically opposed pivot pins 41.

The feed grain through the two elbows 26 and 28, from the sweep screw to the main auger screw 20, there is a flexible auger screw section 42 that connects at one end to the screw 20 and at the opposite end to a sweep screw 44 that extends the length of the sweep housing 40. At the outer end of the housing 40 is a sweep transporting mechanism 46 that engages the floor and causes the sweep to rotate about the rotary joint 30. To facilitate this movement, the elbow 28 is supported on a stud 48 coaxial with the rotary joint 30.

Figure 3:
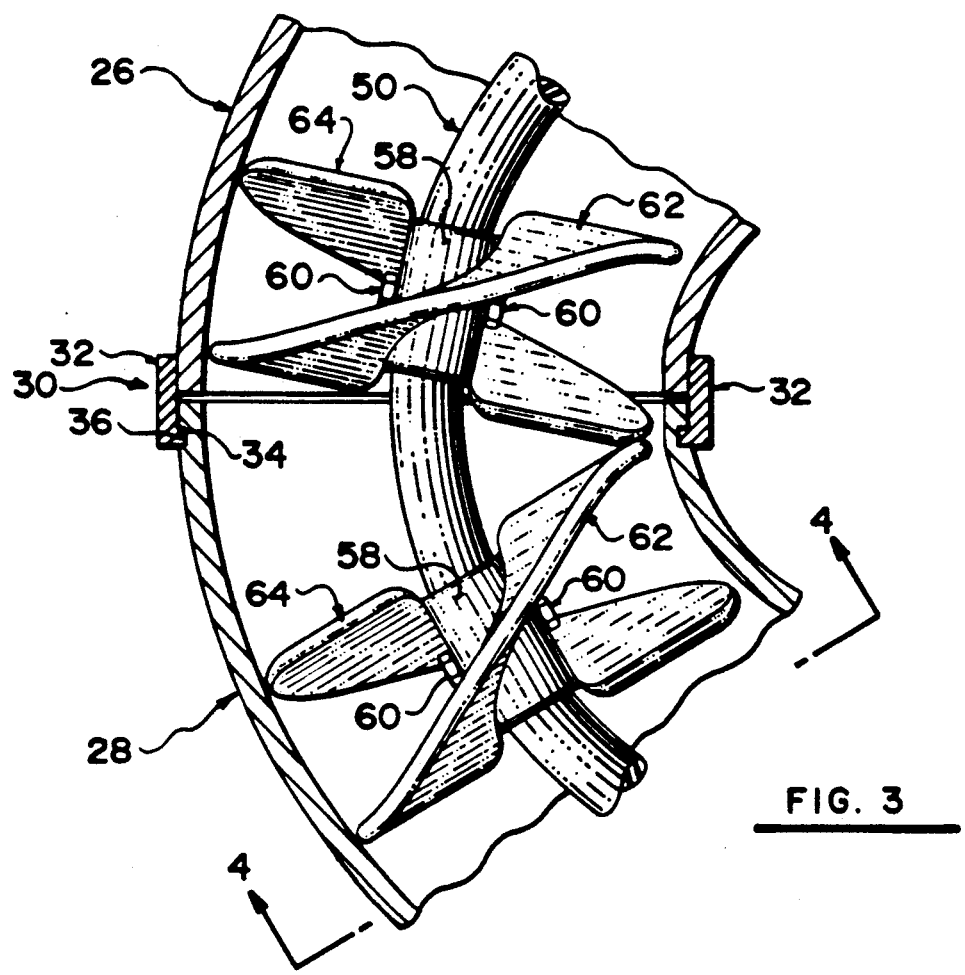
FIG. 3 is a detail of a flexible auger screw section.
Figure 4:
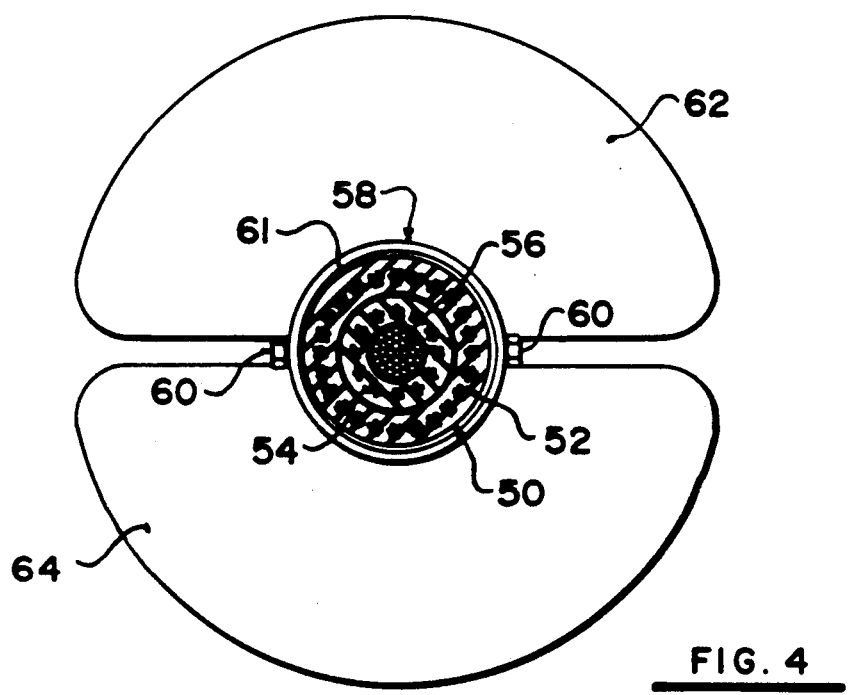
FIG. 4 is a cross section along line 4—4 of FIG. 3.

The configuration of the flexible screw section 42 is illustrated most clearly at FIGS. 3 and 4. The screw has a flexible shaft 50 that is composed of a four braid hydraulic high pressure hose 52 surrounding a smaller two braid hydraulic high pressure hose 54, which in turn surrounds a multi-strand cable 56 which serves as a core for the flexible shaft. The flighting on the shaft is sectional. Each section includes a sleeve 58 secured to the shaft with diametrically opposed self-tapping screws 60. A rubber sleeve 61 may be fitted between the shaft and the sleeve 58 where desired. The flighting includes two flight sections 62 and 64 connected to each sleeve 58. Each extends as shown over substantially 180° of arc. The two flight sections are diametrically opposed that is they are 180° out of phase, so that during use, the sections serve to centre the flexible shaft in the curve of the two elbows 26 and 28.

The housing 40 of the sweep 14 is a telescopic housing having an outer section 66 with a back wall 68, a top wall 70 and a series of elongate grating tubes or bars 72 along the front side. The outer sweep housing is connected to the shroud 38 as discussed above. An inner sweep housing matches the outer housing in its overall shape. It includes a back wall 76 that slides along the inside of the back wall 68, a top wall 78 that slides on the underside of the top wall 70 and a series of grating rods or bars 80 that slide into the grating tubes 72 from their outer ends. A handle 82 is provided at the outer end of the sweep housing section 74. The outer sweep housing is thus freely longitudinally movable to increase or decrease the total effective length thereof.

Within the sweep is a fixed screw conveyor section 84 consisting of a tube 86 fixed at one end to the flexible shaft 50 of the flexible screw section 42. The tube 86 carries flighting 88 in a conventional way. This is combined with a telescoping screw conveyor means 90 that extends along the housing section 74. The screw section 90 includes a rod 92 that slides into the tube 86 and flighting 94 that is connected to the rod 92 only at the outer end of the flighting. The helical flighting 94 is in threaded engagement with the flighting 88 of the fixed screw section so that it can be screwed in and out on the fixed section to shorten or lengthen the sweep auger.

At the outer end of the rod 92, beyond the end of the flighting 94 is a brake disc 96. This runs through a caliper 98 carried by the housing section 74. A brake lever 100 may be used selectively to engage the caliper with the brake disc, thus preventing rotation of the sweep screw section 90. If at the same time, the screw section 84 is rotated, the screw section 90 will be threaded either in or out, to shorten or lengthen the sweep according to the direction of rotation of the screw section 84.

The rod 92 is supported in a bearing 102 in the end wall 104 of the telescoping housing section 74. On the outside of the wall 104, the rod carries a chain sprocket 106. Below the sprocket 106 and spaced apart are two tubular chain guides 108 that entrain a short transport chain 110 that is driven by the sprocket 106. Rotation of the rod 92 drives the sprocket 106 and thus the chain 110. The chain projects below the outer end of the housing 74 so that during operation of the sweep, the chain acts as a drive track. Consequently, the outer end of the sweep will be caused to swing in an arc about the rotary joint 30 where the two elbows 26 and 28 meet. Where desired, the sweep can be lengthened or shortened by using the brake lever 100 and, where necessary, reversing the direction of rotation of the auger.

The only communications of drive therefore from the screw conveyor 84 to the screw conveyor 90 is provided by the contact between the flights as there is no direct drive connection between the cores, that is the rod 92 and the tube 86.

In use of the unloading auger, the sweep may be rotated through 360° around the rotary joint 30 to provide complete floor coverage. The telescoping action of the sweep can adjust the sweep length to suit bins of varying diameter.

While one embodiment of the present invention has been described in the foregoing, it is to be understood that other embodiments are possible within the scope of the invention. The invention is to be considered limited solely by the scope of the appended claims.

I claim:

1. A bin sweep comprising an auger having a first auger section having a first screw conveyor with a first core and a first helical flight secured therealong so as to be rotatable with the first core about an axis of the first core, a second auger section having a second screw conveyor with a second core mounted coaxially with the first core, one of the first and second cores being arranged as a tube such that the other of the first and second cores can slide longitudinally inside the tube, with an outer end of said other of the first and second cores projecting outwardly from an end of the tube, a second helical flight extending along the second core and having substantially the same pitch as the first helical flight, the helical flight secured to said other of the first and second cores being secured only at an outer end of the said other of the first and second cores and being otherwise unconnected thereto, the second flight being in threaded engagement with the first flight whereby relative rotation of the first and second helical flights allows telescoping of the auger to change the combined length of the screw conveyors, first drive means for causing rotation of the first and second auger sections about a common vertical axis at an inner end of the first auger section such that the auger sections can rotate around the vertical axis adjacent a vertical axis of a bin with the first and second screw conveyors transporting the material from the bin toward the vertical axis, second drive means connected to said first core so as to rotatably drive said first screw conveyor about the axis of the core, drive connecting means for communicating rotation from said first screw conveyor to said second screw conveyor being provided solely by contact between said first and second helical flights, and brake means actuable to temporarily inhibit rotation of the second screw conveyor so as to screw the second helical flight inwardly into the first helical flight.

2. The bin sweep according to claim 1 including shroud means extending around the screw conveyors, the length of the shroud means being adjustable to accomodate changes in length of the screw conveyors.

3. The bin sweep according to claim 1 including shroud means extending partly around the screw conveyors and extending along the length thereof, said brake means attached to said shroud means.

4. The bin sweep according to claim 2 wherein the shroud means includes an open face substantially along the full length thereof so as to allow entry of the material from the bin into contact with the first and second screw conveyors substantially along the full length thereof and an open bottom allowing contact between an underside of the screw conveyors and the material to be transported.

5. The bin sweep according to claim 3 wherein the shroud means includes an open front face facing forwardly in a direction of travel of the screw conveyors around said vertical axis, said front face including a plurality of bars extending longitudinally of the screw conveyors.

6. The bin sweep according to claim 5 wherein the bars include telescoping portions for adjustment of the length thereof.

7. The bin sweep according to claim 1 including a third auger section, means coupling the third auger section to an end of the first auger section remote from the second auger section including connecting means allowing rotation of the first and second auger sections relative to a vertical axis defined on the third auger section such that the third auger section can extend from a position inside a bin to a fixed location exteriorly of the bin while the first and second auger sections rotate around the vertical axis within the bin.

8. The bin sweep according to claim 7 wherein the connecting means comprises a first substantially right angled rigid tubular elbow connected to the third auger section, a second substantially right angled rigid tubular elbow connected to the end of the first auger section and means coupling the first and second elbows for free rotation about a generally upright axis.

9. The bin sweep according to claim 7 including means for supporting the third auger section for transportation of the third auger section with the first auger section coupled thereto and supported thereby in cantilever manner from a bin to a second bin, said supporting means being arranged at an end of the third auger section remote from the connecting means such that the supporting means can be arranged exteriorly of the bin to insert the third auger section and the connecting means into a position adjacent a centre of the bin.

10. The bin sweep according to claim 7 including pivot coupling means connecting the end of the first auger to the connecting means, said pivot coupling means allowing pivotal action of the first and second auger sections relative to the first auger section about a substantially horizontal axis transverse to the axis of the first auger section.

11. The bin sweep according to claim 7 including a flexible auger core secured to an end of the first core and to an end of a core of the third auger section, said flexible core extending through said connecting means substantially concentrically therein, a plurality of collars secured to the flexible core at positions spaced therealong, each collar having attached thereto helical flight means for transporting material from the first auger section into the third auger section.

12. The bin sweep according to claim 11 wherein each collar carries a first and a second helical flight portion each separate from the other and lying 180° out of phase with the other and each extending over substantially only 180° around the axis.

13. The bin sweep according to claim 1 including drive means mounted at an end of the second screw conveyor remote from said vertical axis for engaging a floor of the bin to cause rotation of the auger sections around the vertical axis, the drive means comprising a chain sprocket secured to the second core and having a diameter less than that of the second helical flight, chain guide means positioned below the sprocket and the chain entrained around the sprocket and the chain guide means for engagement with the floor for causing driving action in response to rotation of the second core.

14. A bin sweep comprising a first auger section having an auger tube, a screw conveyor with a first core and a first helical flight secured therealong so as to be rotatable with the first core about a longitudinal axis of the first core within the auger tube, a second auger section having a shroud, a second core and a second helical flight secured therealong so as to be rotatable with the second core about a longitudinal axis of the second core within the shroud, means for supporting the first auger section with the second auger section coupled thereto and supported thereby in cantilever manner, such that the auger tube can extend from a first feed end thereof within a bin to be emptied of a stored material to a second discharge end exteriorly of the bin for discharge of the material, a first substantially right angle rigid tubular smoothly curved elbow having a first end connected to and substantially contiguous with the auger tube, a second substantially right angle rigid tubular smoothly curved elbow having a first end connected to the shroud, means coupling a second end of the first elbow to a second end of the second elbow, said coupling means allowing rotation between said first and second elbows to cause rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, and means for communicating rotation of said first core to said second core comprising a flexible core portion secured to an end of the first core and to an end of the second core, said flexible core portion extending through an interior of said first and second elbows and said coupling means, said flexible core portion carrying a plurality of separate collars thereon each having auger flight means thereon for transporting material through said elbows, and pivot coupling means mounting said shroud on said second elbow for pivotal movement of the shroud about a horizontal axis transverse to the length of the second auger section.

15. The bin sweep according to claim 14 wherein said drive means is mounted at an end of the second core remote from said vertical axis and includes means for engaging a floor of the bin to cause rotation of the second auger section around the vertical axis, said drive means comprising a chain sprocket secured to the second core and having a diameter less than that of the second helical flight, chain guide means positioned below the sprocket and the chain entrained around the sprocket and the chain guide means for engagement with the floor for causing driving action in response to rotation of the second core.

16. The bin sweep according to claim 14 including means for varying the effective length of the second auger section.

17. The bin sweep according to claim 14 including shroud means extending over an upper and rear part of the first auger section such that the forward movement of the first auger section allows entry of material through a front face thereof.

18. The bin sweep according to claim 17 wherein the shroud means includes an open front face facing forwardly in a direction of travel of the screw conveyors around said vertical axis, said front face including a plurality of bars extending longitudinally of the screw conveyors.

19. The bin sweep according to claim 14 wherein each collar carries a first and a second helical flight portion each separate from the other and lying 180° out of phase with the other and each extending over substantially only 180° around the axis.

20. A bin sweep comprising a first auger section having a screw conveyor with a first core and a first helical flight secured therealong so as to be rotatable with the first core about a longitudinal axis of the first core, a second auger section with a second core and a second helical flight secured therealong so as to be rotatable with the second core about a longitudinal axis of the second core, means mounting the first auger section such that it can extend from a first feed end thereof within a bin to be emptied of a stored material to a second discharge end exteriorly of the bin for discharge of the material, means coupling the second auger section to the first end of the first auger section, said coupling means allowing rotation of the second auger section about a vertical axis defined on the first auger section such that the second auger section can rotate around the vertical axis through 360° within the bin to collect the material from an area surrounding said first end, drive means for drivingly rotating said second auger section about said vertical axis, said second auger section including shroud means extending along the length thereof, the shroud means including a top portion and a rear portion both of which are formed by a substantially imperforate sheet confining the material collected by the second helical flight for transportation by the flight along the shroud means to the first auger section, said shroud means further including a front portion defined by a grid structure having transversely spaced, longitudinally extending bars allowing entry of the material into the second auger section as the second auger section moves around said vertical axis.

21. The bin sweep according to claim 20 wherein the front portion includes a plurality of longitudinal bars each extending substantially parallel to the second core, said second auger section including means for varying the effective length thereof from the vertical axis to an outermost end thereof, each of said bars including a telescoping section for increasing and decreasing the effective length of the bar.

* * * * *